United States Patent Office 3,813,288
Patented May 28, 1974

3,813,288
NUCLEAR REACTOR FUEL ASSEMBLY
SPACER GRID
Bernard Leaver, Atherton, and Willard Mercer, Preston, England, assignors to United Kingdom Atomic Energy Authority, London, England
Filed June 29, 1972, Ser. No. 267,627
Claims priority, application Great Britain, July 7, 1971, 32,005/71
Int. Cl. G21c 3/34
U.S. Cl. 176—78                                         3 Claims

ABSTRACT OF THE DISCLOSURE

A spacer grid in a fuel element assembly including a plurality of elongate fuel pins supported in a bundle with their longitudinal axes parallel comprises intersecting strip members which extend in at least two directions between parallel rows of the fuel pins in the fuel element assembly, a closely spaced pair of the strip members extending parallel to one another between each row of the fuel pins and the next, the intersecting strip members defining a plurality of cells each penetrated by a fuel pin, and the fuel pins being laterally located in the fuel element assembly by contact with the walls of the cells.

BACKGROUND OF THE INVENTION

This invention relates to nuclear reactor fuel element assemblies and in particular to that kind of fuel element assembly including a plurality of elongate fuel pins supported in a bundle with their longitudinal axes parallel. Such a fuel element assembly employs one or more spacer grids disposed intermediate the ends of the assembly and serving to retain the correct lateral location of the fuel pins in the assembly relative to one another. Such grids typically comprise a group of cells each for penetration by a fuel pin and are usually fabricated from thin strip material or thin walled tubes such as stainless steel in an attempt to minimize restriction to reactor coolant flow which is axially through the bundle between the fuel pins. Location of the fuel pins may be by rigid projections formed inside the cells of the spacer grid. The projections may be an interference fit or a close clearance fit with the fuel pins and the grids must be made with a high degree of precision to ensure accurate geometrical spacing of the fuel pins a feature which makes such grids expensive to fabricate. Also although the tolerances allowed on manufacture of such spacer grids and on the diameter of the fuel pins are kept to a minimum, slight inaccuracies in manufacture may give rise to large clearances arising between some of the projections and the fuel pins allowing lateral vibration of these fuel pins which gives rise to "fretting" of the fuel pins. "Fretting" is surface damage of the fuel pins due to tapping of the fuel pins against the locating projections in the cells of the spacer grids. This disadvantage has been largely overcome in the type of spacer grid in which the fuel pins are a clearance fit in the cells of the grid and by the attachment of wearing pads to the fuel pins at points of tapping of the fuel pins in the cells of the grids. However the attachment of such wearing pads to the fuel pins introduces further problems and adds to the expense of fabrication of the fuel element assembly.

Yet another form of spacer grid provides for resilient bracing of the fuel pins for example by spring locating members projecting inside the cells of the grid. The spring locating members may hold the fuel pins against opposed rigid projections inside the cells of the grid. Again such a grid calls for a high accuracy of manufacture and "fretting" can still occur in this arrangement between the fuel pins and the rigid locating projections.

It is an object of the present invention to provide a simple form of spacer grid which does not call for a high degree of accuracy in manufacture and which will render some of the disadvantages of previous forms of spacer grids less significant.

SUMMARY OF THE INVENTION

According to the present invention a spacer grid for a nuclear reactor fuel element assembly of the hereinbefore specified kind comprises intersecting strip members which extend in at least two directions between parallel rows of the fuel pins in the fuel element assembly, a closely spaced pair of the strip members extending parallel to one another between each row of the fuel pins and the next, the intersecting strip members defining a plurality of cells each penetrated by a fuel pin, and the fuel pins being laterally located in the fuel element assembly by contact with the walls of the cells. In this arrangement the spacing of the rows of fuel pins is governed by the spacing of the pairs of strip members which extend between successive rows of the fuel pins. Flexibility in the strip members provides a degree of flexibility in the lateral location of the fuel pins. However the degree of lateral movement of adjacent fuel pins, one relative to the other, is limited by contact between opposed points on the faces of the pair of strip members in the region between each adjacent pair of fuel pins.

In a preferred arrangement facing stop means are formed projecting one from each of the opposite faces of the pair of strip members between each adjacent pair of fuel pins. The amount of clearance between the facing stop means controls the degree of lateral movement of the fuel pins. During fuel pin vibration the facing stop means tap together and thus any fretting is taken between the facing stop means and not at the contact face of the fuel pins with the walls of the cells in the grid structure.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
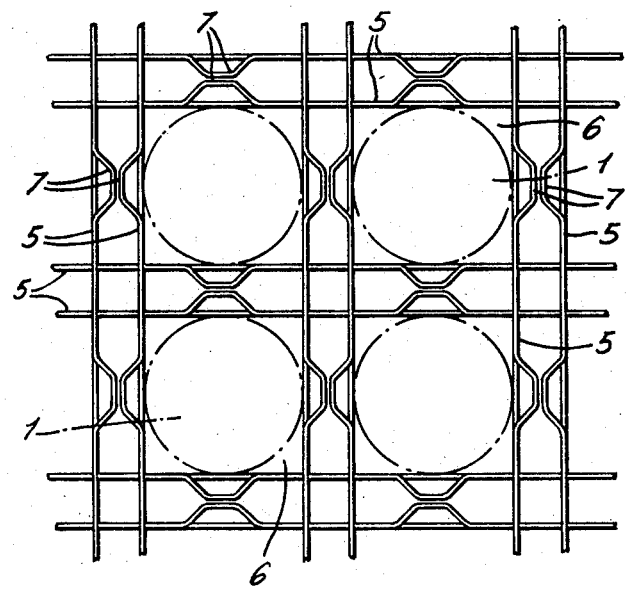
FIG. 1 is a plan view of part of a nuclear reactor fuel element assembly incorporating a spacer grid in accordance with the invention.
Figure 2:
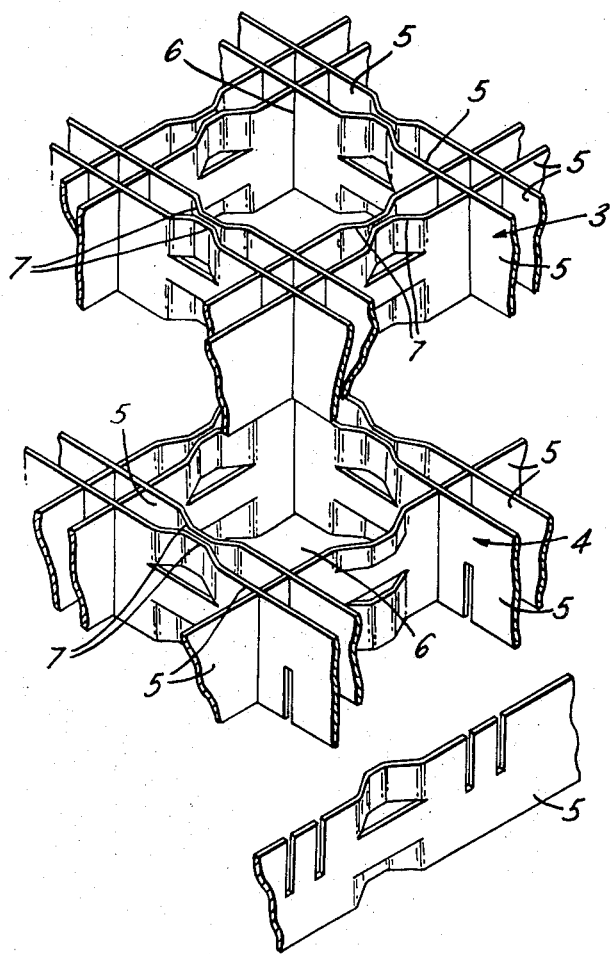
FIG. 2 is an isometric detail of the spacer grid shown in FIG. 1.

FIG. 1 shows part of a nuclear reactor fuel element assembly comprising a plurality of cylindrical fuel pins 1 arranged with their longiutdinal axes parallel. The fuel pins 1 are spaced apart and located at points intermediate their ends by transverse spacer grids, one of which is shown in FIGS. 1 and 2. Each spacer grid comprises an upper tier 3 and a lower tier 4 held together by a deep outer band (not shown). Both the tiers 3 and 4 are identical, being constructed from strip members 5 or resilient material. The strip members 5 forming the tiers 3 and 4 intersect in "egg-box" manner, all points of intersection of the strip members being brazed or welded.

In each of the tiers 3 and 4 a pair of the strip members 5 extends between each successive row of fuel pins 1. The strips members 5 define box shaped cells 6 which are penetrated by the fuel pins 1. The fuel pins 1 are an interference fit with the flat faces of the cells 6, which provide flexible lateral support for the fuel pins 1. The flexibility of the support can be modified in stiffness by altering the degree of interference fit of the fuel pins 1 in the cells 6 or by altering the thickness of the strip members 5.

Dimple shaped stops 7 are formed on the strip members 5 projecting into the space between each pair of strip members 5 so that a stop 7 projects outwardly from each face of each cell 6. It is arranged that between each adjacent pair of cells 6 a stop 7 projects from the face of the one cell 6 and faces a stop 7 projecting from the face of the other cell 6. The overall spacing between the pairs of strip members 5 governs the overall spacing of the rows of fuel pins 1. The clearance between the opposed stops 7 of adjacent cells 6 limits the degree of lateral vibration of the fuel pins 1 to limit the minimum pin to pin clearance. Tapping between the opposing stops 7 also acts to absorb fuel pin vibration and thus any fretting is limited to the area of contact of the opposing stops 7 thus avoiding fretting at the points of contact of the fuel pins 1 with the faces of the cells 6.

Figure 3:
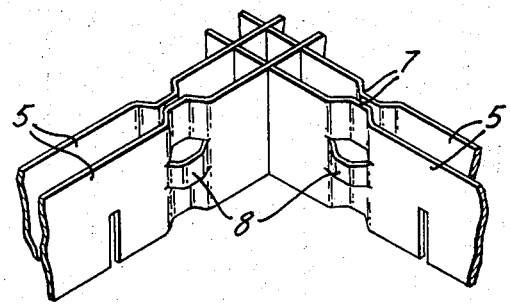
FIG. 3 is an isometric detail of a modification of the spacer grid of FIG. 2.

In FIGS. 1 and 2 the fuel pins 1 are in contact with the flat faces of the cells 6. However as shown in FIG. 3 fuel pin location dimples 8 may be formed extending inside the cells 6, the fuel pins 1 being an interference fit with the dimples 8. The profile of the contact face of the cells 6 with the fuel pins 1 may be within the two extremes illustrated in FIGS. 1 and 3.

In a fuel element assembly a number of the spacer grids 2 are provided at spaced intervals along the length of the assembly. The spacer grids 2 may be attached to one of the fuel pins 1 or, alternatively, one of the fuel pins 1 may be replaced by an unfueled support tube to which the spacer grids 2 are attached.

We claim:
1. A fuel assembly comprising:
  a spacer grid for spacing apart a plurality of nuclear fuel rods, said grid including a plurality of first parallel metal strips which intersect with other metal strips disposed at an angle to the first said metal strips at intersection points to form a plurality of polygonal cells,
  each said metal strip being in the form of a pair of parallel flat metal ribbons lying in planes parallel to the longitudinal axes of the fuel rods, each said pair forming, between its said points of intersection with the other metal strip disposed at an angle thereto, (a) flat surfaces on the outer sides of the ribbons facing away from each other to form flat sidewalls for the two cells adjacent to each other on opposite sides of that strip, and (b) protuberant stop members projecting towards each other and spaced apart from each other a small predetermined distance on the sides of the ribbons facing each other,
  each polygonal cell thus being formed by a plurality of flat sidewalls formed by the said outer sides of the pairs of ribbons, said flat sidewalls being rigidly connected to each other at points of intersection thereof to form an essentially rigid cell which moves as a unit in a plane tranverse to the longitudinal direction of the cells,
  each cell having a nuclear fuel rod positioned therein in an interference fit with the said flat sidewalls of the cell so that each fuel rod is maintained at all times in contact with the sidewalls of its respective cell,
  whereby, upon deflection of the fuel rods and grid in the direction transverse to the longitudinal direction of the fuel rods, each cell moves as a unit maintaining its interference fit with its respective fuel rod, as the deflections are limited by engagement of the protuberant stop members with each other upon movement through said predetermined distance.

2. A fuel assembly according to claim 1, in which said metal strips lie in planes normal to one another to form square cells.

3. A fuel assembly according to claim 1, in which the stop members are formed by deformation of the metal strip.

References Cited
UNITED STATES PATENTS 3,380,890    4/1968    Glandin et al. _____ 176—78

FOREIGN PATENTS 2,005,061    9/1970    Germany _____ 176—78

CARL D. QUARFORTH, Primary Examiner

R. S. GAITHER, Assistant Examiner

U.S. Cl. X.R.
176—76